Feb. 23, 1954 G. W. REHFELD 2,669,844
JETTY
Filed March 15, 1951 2 Sheets-Sheet 1

Inventor
George W. Rehfeld
By
Fishburn & Mullendore
Attorneys

Feb. 23, 1954 G. W. REHFELD 2,669,844
JETTY
Filed March 15, 1951 2 Sheets-Sheet 2

Inventor
George W. Rehfeld
By
Fishburn + Mullendore
Attorneys

Patented Feb. 23, 1954

2,669,844

UNITED STATES PATENT OFFICE 2,669,844

JETTY

George W. Rehfeld, Manhattan, Kans.

Application March 15, 1951, Serial No. 215,762

1 Claim. (Cl. 61—3)

This invention relates to jetties particularly of the type composed of structural members such as angle irons. Jetties of this type are very effective in the control of streams, but with present economic conditions structural members are difficult to obtain, prices are high, and the cost of such jetties restrict their use because of the amount of material required. For example, such jetties comprise three or more structural members, which for the economy resulting from mass production have been fabricated to certain like standards. Consequently, when the jetties were erected, they had like form and little thought has been given as to whether or not each jetty effectively fits its site or that optimum efficiency is obtained from the material used.

After giving the matter much study, I have discovered that the super structure of such jetties are not as effective as they might be, and that the material used can be greatly reduced or made more effective for the intended purpose, thereby reducing the amount of materials that have become expensive and difficult to obtain on present markets. I have also discovered that the strength/weight ratio of such jetties may be greatly increased so that they better withstand the buffeting forces to which they are subjected.

Therefore, the principal objects of the present invention are to provide a jetty structure wherein the structural members are arranged to obtain optimum efficiency for the material used; to provide a jetty construction wherein the super structure is better supported; to provide a jetty structure composed of parts capable of standardization and adapted for assembly into a jetty better fitted to its individual site; to provide a jetty having a higher strength/weight ratio; to provide a jetty construction which permits interconnection of the super structures with the anchoring cables, thereby providing better stabilization of the jetties to withstand the forces of the currents and shocks produced by floating debris; to provide a jetty construction wherein the parts are readily interconnected to give the desired form for each particular location; and to provide a jetty structure carrying the major lacing below the anchorage point of the connecting cables.

In accomplishing these and other objects of the invention as hereinafter pointed out, I have provided improved structure, the preferred forms of which are illustrated in the accompanying drawings wherein.

Figure 1:
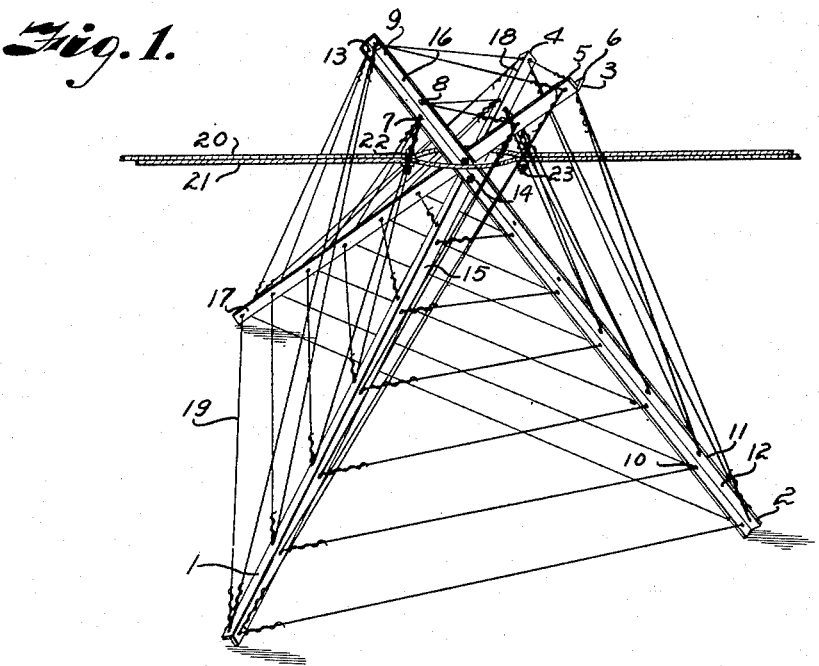
Fig. 1 is a perspective view of a jetty embodying the features of the present invention with the members secured near their upper ends to provide a jetty having a low super structure above the anchoring cables.

Referring more in detail to the drawings and first to Fig. 1.

1 designates a jetty embodying the features of the present invention consisting of structural members 2, 3 and 4 preferably angle irons of relatively standard jetty lengths, for example, sixteen feet and having relatively wide flanges 5 and 6 that are punched along their length to provide a series of holes 7 and 8. The holes are formed in the respective flanges substantially in the longitudinal median line thereof. The holes of the series 7 and 8 are staggered, that is, any hole in the series 7 is staggered with respect to the corresponding opening in the series 8, the amount of stagger being equal to the width of the flanges. The outer endmost holes 13 at the ends 9 and 12 of the angles for the series 7 and 8 may be equally spaced from the ends of the members.

The angle members are, therefore, of like length and punched for mass production, however, when the members are assembled to form a jetty, various holes in the series 7 and 8 may be used to vary the height, the expanse of coverage, and the length of the legs to accommodate it to the conditions at the place of use. Also, the members fit closely together at any of the points of connection to impart rigidity without the use of multiple fastening devices at the crossing points of the respective members. This is an important advantage because larger bolts 14 may be used, since they last longer under the corrosion effects of river waters. Also, there is less weakening of the angles by the openings required for the single bolts.

In assembling a jetty, the outer flat surfaces 15 of the flanges 5 of the members 2 and 3 are brought into contact with one member crossing the other at an angle substantially 90° at the point to be connected by a bolt 14. If a wide spacing of the leg ends designated 12 is desired, one of the outermost holes of the series 7 is brought into registry and the shank of the bolt 14 is passed therethrough which when tightened retains the members in crossing relation. If desired, the arm portions 16 formed by the ends 9 may be made longer by using holes nearer the mid point of the members or one leg portion 17 formed by the ends 12 may be made longer than the other by selecting the next outer hole in one of the legs. After connection of the members 2 and 3, the outer faces 18 of the flanges 6 form a saddle-like support or crotch of 90° which closely fits the flanges 5 and 6 of the member 4. The member 4 is then shifted so as to register any two adjacent staggered openings in the flanges thereof with the openings in the flanges 6 that are near the crossing point of the members 2 and 3. The same relative openings in the member 4 may be used that were used in connecting the members 2 and 3 so that the leg and arm portions are of the same relative length as shown in Fig. 1. However, in using the members in this manner, the higher holes are used to increase the base spread and reduce the extent of the super structure that is formed by the arm portions 16.

After setting up the jetty, the arm and leg portions 9 and 12 are provided with a lacing 19 comprising wires that are threaded through the series of holes 7 and 8 in the leg portions and the remaining holes 7 and 8 in the arm portions as shown in Fig. 1.

Figure 3:
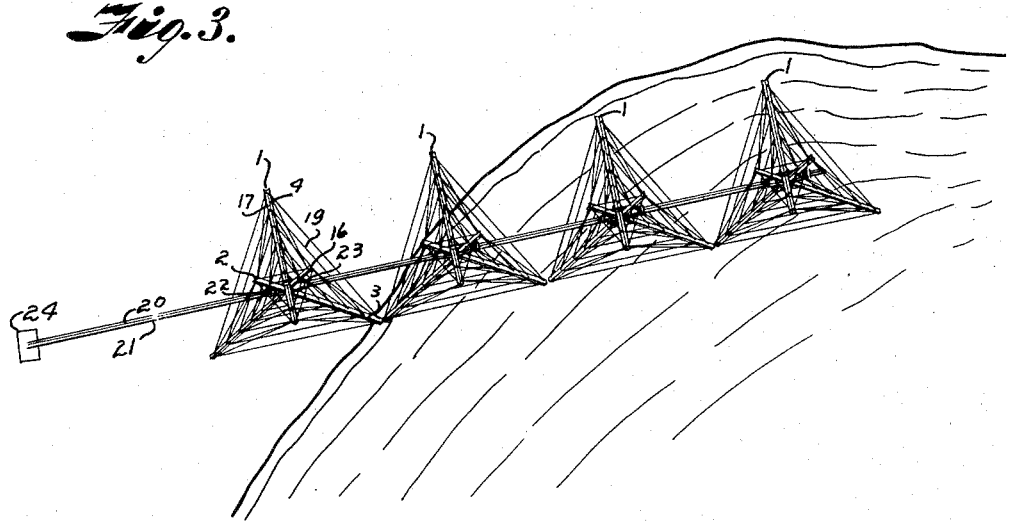
Fig. 3 is a plan view of a line of jetties of the form illustrated in Fig. 1 arranged along a river bank and secured by anchoring cables attached to a dead man.
Figure 4:
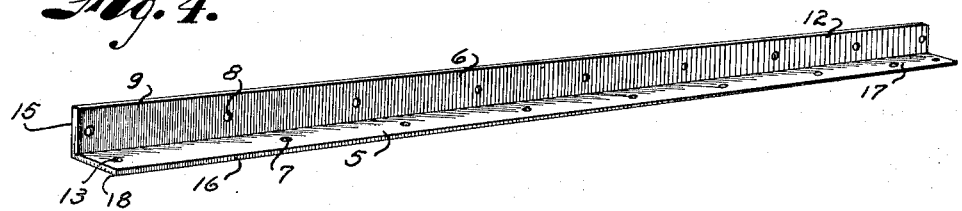
Fig. 4 is an enlarged perspective view of one of the jetty members showing the arrangement of holes therein.
Figure 5:
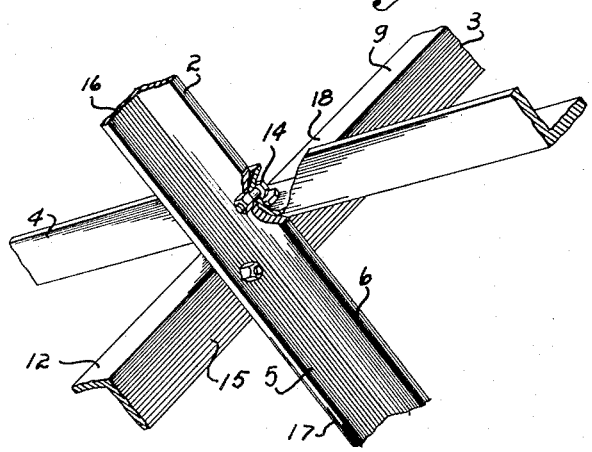
Fig. 5 is an enlarged fragmentary perspective view showing the bolting arrangement.

After assembly, the jetties are secured to cables 20 and 21 that are run on opposite sides of the crossing point of the members 2 and 3 and connected together by clamps 22 and 23, the bank ends of the cables being anchored to suitable anchorage, for example, a dead man 24 buried in the river bank as shown in Fig. 3.

Figure 2:
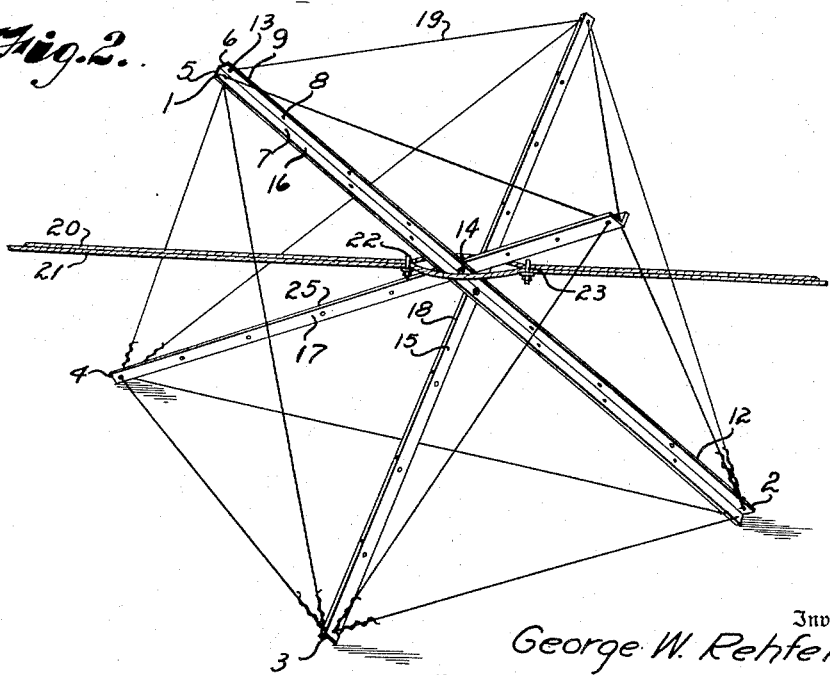
Fig. 2 is a similar view showing a jetty with the front members connected to provide leg portions of equal length and the other member connected to provide a relatively longer brace leg or prop.

In the form shown in Fig. 2, the members 2 and 3 are secured together by using the innermost holes of the series 7 and 8 and then connecting the other member 4 in the angle thereof by using holes near the outer ends. This arrangement not only increases the base spread but provides a long prop leg 25 to stabilize the jetty when placed in position to receive the main force of the current.

From the foregoing it is obvious that I have provided a structure which utilizes to full advantage the material employed and which gives a wider base spread to reduce the number of jetties required to cover a given area. It is also obvious that the jetties may be erected to better conform to certain bank and water conditions in which the jetties are placed.

The relatively long, wide spread ground supports or leg portions give the necessary strength and stability and carry the major portion of the lacing so that it is in position to be most effective in obstructing flow of a stream. Also, since these portions of the jetties are anchored to the ground by deposited debris and the tops anchored by the cables, they are very rigid and soon become firmly established. The arm portions, being relatively short are capable of withstanding the blunt of heavy ice and driftwood.

What I claim and desire to secure by Letters Patent is:

A jetty comprising three angle members, each having substantially right angular flanges provided with a series of apertures arranged along the length of said flanges and with the apertures in one flange staggered with respect to the apertures in the outer flange, two of said members being crossed near upper ends thereof to provide relatively long downwardly diverging leg portions and shorter upwardly diverging arm portions, said members being positioned with one flange of one member in face contact with a flange of the other member and an aperture of each of said flanges in registering relation, said other flanges forming a substantially right angular crotch shaped seat at said crossing point, said third member having the flanges thereof engaged in said seat, said flanges thereof being in contact with said seat forming flanges and with apertures in said flanges in registry, fastening devices extending through all of said registering openings to secure the members together, and lacing extending through other apertures in the flanges of said members, said third member having a relatively long leg portion forming a single prop for supporting said two members with the lacing therebetween positioned for forming an abutment face to a stream in which the jetty is to be installed.

GEORGE W. REHFELD.

References Cited in the file of this patent

UNITED STATES PATENTS

| Number | Name | Date |
|---|---|---|
| 1,487,668 | Rehfeld | Mar. 18, 1924 |
| 1,609,633 | Rehfeld | Dec. 7, 1926 |
| 2,032,582 | Lashmet | Mar. 3, 1936 |
| 2,248,722 | Rehfeld | July 8, 1941 |
| 2,437,754 | Rehfeld | Mar. 16, 1948 |